United States Patent [19]

Tang et al.

[11] Patent Number: 5,822,698
[45] Date of Patent: *Oct. 13, 1998

[54] MICROCELL FREQUENCY PLANNING

[75] Inventors: Yuqiang Tang, Plano; Z. K. Cheng, Richardson; Man-Fai Ng, Plano, all of Tex.

[73] Assignee: Northern Telecom Limited, Montreal, Canada

[*] Notice: This patent issued on a continued prosecution application filed under 37 CFR 1.53(d), and is subject to the twenty year patent term provisions of 35 U.S.C. 154(a)(2).

[21] Appl. No.: 689,533

[22] Filed: Aug. 8, 1996

[51] Int. Cl.$^6$ .................................................. H04B 7/00
[52] U.S. Cl. .......................... 455/447; 455/449; 455/62
[58] Field of Search .................... 455/447, 449, 455/451, 453, 448, 446, 450, 62, 522, 63

[56] References Cited

U.S. PATENT DOCUMENTS

| | | | |
|---|---|---|---|
| 4,144,411 | 3/1979 | Frenkiel | 455/449 |
| 4,790,000 | 12/1988 | Kinoshita | 455/522 |
| 5,247,699 | 9/1993 | Hartman | 455/449 |
| 5,483,667 | 1/1996 | Faruque | 455/447 |
| 5,546,443 | 8/1996 | Raith | 455/449 |
| 5,551,060 | 8/1996 | Fujii et al. | 455/449 |
| 5,625,672 | 4/1997 | Yamada | 455/449 |

*Primary Examiner*—Reinhard J. Eisenzopf
*Assistant Examiner*—Lester G. Kincaid
*Attorney, Agent, or Firm*—Kenneth W. Bolvin

[57] ABSTRACT

The system is comprised of a microcellular underlay to increase the coverage of a macrocellular overlay system. The frequencies are assigned to the microcells by interleaved frequency segregation. Channels are selected from the macrocell frequency groups based on a minimum channel separation from the other channels in the microcell frequency group. The channels in the microcell frequency group that are greater than a minimum channel separation from the channels in the macrocell sector i overlay are assigned to the microcell sector i.

8 Claims, 5 Drawing Sheets

MACROCELL FREQUENCY PLAN, N=7, THREE SECTORS

| | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| ROW | 1A | 2A | 3A | 4A | 5A | 6A | 7A | 1B | 2B | 3B | 4B | 5B | 6B | 7B | 1C | 2C | 3C | 4C | 5C | 6C | 7C |
| 1 | 1 | 2 | 3 | 4 | 5 | 6 | 7 | 8 | 9 | 10 | 11 | 12 | 13 | 14 | 15 | 16 | 17 | 18 | 19 | 20 | 21 |
| 2 | 22 | 23 | 24 | 25 | 26 | 27 | 28 | 29 | 30 | 31 | 32 | 33 | 34 | 35 | 36 | 37 | 38 | 39 | 40 | 41 | 42 |
| 3 | 43 | 44 | 45 | 46 | 47 | 48 | 49 | 50 | 51 | 52 | 53 | 54 | 55 | 56 | 57 | 58 | 59 | 60 | 61 | 62 | 63 |
| 4 | 64 | 65 | 66 | 67 | 68 | 69 | 70 | 71 | 72 | 73 | 74 | 75 | 76 | 77 | 78 | 79 | 80 | 81 | 82 | 83 | 84 |
| 5 | 85 | 86 | 87 | 88 | 89 | 90 | 91 | 92 | 93 | 94 | 95 | 96 | 97 | 98 | 99 | 100 | 101 | 102 | 103 | 104 | 105 |
| 6 | 106 | 107 | 108 | 109 | 110 | 111 | 112 | 113 | 114 | 115 | 116 | 117 | 118 | 119 | 120 | 121 | 122 | 123 | 124 | 125 | 126 |
| 7 | 127 | 128 | 129 | 130 | 131 | 132 | 133 | 134 | 135 | 136 | 137 | 138 | 139 | 140 | 141 | 142 | 143 | 144 | 145 | 146 | 147 |
| 8 | 148 | 149 | 150 | 151 | 152 | 153 | 154 | 155 | 156 | 157 | 158 | 159 | 160 | 161 | 162 | 163 | 164 | 165 | 166 | 167 | 168 |
| 9 | 169 | 170 | 171 | 172 | 173 | 174 | 175 | 176 | 177 | 178 | 179 | 180 | 181 | 182 | 183 | 184 | 185 | 186 | 187 | 188 | 189 |
| 10 | 190 | 191 | 192 | 193 | 194 | 195 | 196 | 197 | 198 | 199 | 200 | 201 | 202 | 203 | 204 | 205 | 206 | 207 | 208 | 209 | 210 |
| 11 | 211 | 212 | 213 | 214 | 215 | 216 | 217 | 218 | 219 | 220 | 221 | 222 | 223 | 224 | 225 | 226 | 227 | 228 | 229 | 230 | 231 |
| 12 | 232 | 233 | 234 | 235 | 236 | 237 | 238 | 239 | 240 | 241 | 242 | 243 | 244 | 245 | 246 | 247 | 248 | 249 | 250 | 251 | 252 |
| 13 | 253 | 254 | 255 | 256 | 257 | 258 | 259 | 260 | 261 | 262 | 263 | 264 | 265 | 266 | 267 | 268 | 269 | 270 | 271 | 272 | 273 |
| 14 | 274 | 275 | 276 | 277 | 278 | 279 | 280 | 281 | 282 | 283 | 284 | 285 | 286 | 287 | 288 | 289 | 290 | 291 | 292 | 293 | 294 |
| 15 | 295 | 296 | 297 | 298 | 299 | 300 | 301 | 302 | 303 | 304 | 305 | 306 | 307 | 308 | 309 | 310 | 311 | 312 | 313 | 314 | 315 |
| 16 | 316 | 317 | 318 | 319 | 320 | 321 | 322 | 323 | 324 | 325 | 326 | 327 | 328 | 329 | 330 | 331 | 332 | 333 | 334 | 335 | 336 |
| 17 | 337 | 338 | 339 | 340 | 341 | 342 | 343 | 344 | 345 | 346 | 347 | 348 | 349 | 350 | 351 | 352 | 353 | 354 | 355 | 356 | 357 |
| 18 | 358 | 359 | 360 | 361 | 362 | 363 | 364 | 365 | 366 | 367 | 368 | 369 | 370 | 371 | 372 | 373 | 374 | 375 | 376 | 377 | 378 |
| 19 | 379 | 380 | 381 | 382 | 383 | 384 | 385 | 386 | 387 | 388 | 389 | 390 | 391 | 392 | 393 | 394 | 395 | 396 | 397 | 398 | 399 |
| 20 | 400 | 401 | 402 | 403 | 404 | 405 | 406 | 407 | 408 | 409 | 410 | 411 | 412 | 413 | 414 | 415 | 416 | | | | |

UNDERLAY MICROCELL FREQUENCY PLAN

| | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| ROW | 1A | 2A | 3A | 4A | 5A | 6A | 7A | 1B | 2B | 3B | 4B | 5B | 6B | 7B | 1C | 2C | 3C | 4C | 5C | 6C | 7C |
| 1 | 1 | 81 | 61 | 41 | 21 | 1 | 1 | 1 | 1 | 1 | 1 | 1 | 1 | 1 | 1 | 1 | 81 | 61 | 41 | 21 |
| 2 | 101 | 101 | 81 | 61 | 41 | 21 | 21 | 21 | 21 | 21 | 21 | 21 | 21 | 21 | 21 | 101 | 181 | 161 | 141 | 121 |
| 3 | 121 | 121 | 101 | 81 | 61 | 41 | 41 | 41 | 41 | 41 | 41 | 41 | 41 | 41 | 121 | 201 | 201 | 181 | 161 | 141 |
| 4 | 141 | 141 | 121 | 101 | 81 | 61 | 61 | 61 | 61 | 61 | 61 | 61 | 61 | 141 | 221 | 221 | 221 | 201 | 181 | 161 |
| 5 | 161 | 161 | 141 | 121 | 101 | 81 | 81 | 81 | 81 | 81 | 81 | 81 | 161 | 241 | 241 | 241 | 241 | 221 | 201 | 181 |
| 6 | 181 | 181 | 161 | 141 | 121 | 101 | 101 | 101 | 101 | 101 | 101 | 181 | 261 | 261 | 261 | 261 | 261 | 241 | 221 | 201 |
| 7 | 201 | 201 | 181 | 161 | 141 | 121 | 121 | 121 | 121 | 121 | 201 | 281 | 281 | 281 | 281 | 281 | 281 | 261 | 241 | 221 |
| 8 | 221 | 221 | 201 | 181 | 161 | 141 | 141 | 141 | 141 | 221 | 301 | 301 | 301 | 301 | 301 | 301 | 301 | 281 | 261 | 241 |
| 9 | 241 | 241 | 221 | 201 | 181 | 161 | 161 | 161 | 241 | 321 | 321 | 321 | 321 | 321 | 321 | 321 | 321 | 301 | 281 | 261 |
| 10 | 261 | 261 | 241 | 221 | 201 | 181 | 181 | 261 | 341 | 341 | 341 | 341 | 341 | 341 | 341 | 341 | 341 | 321 | 301 | 281 |
| 11 | 281 | 281 | 261 | 241 | 221 | 201 | 281 | 361 | 361 | 361 | 361 | 361 | 361 | 361 | 361 | 361 | 361 | 341 | 321 | 301 |
| 12 | 301 | 301 | 281 | 261 | 241 | 221 | 381 | 381 | 381 | 381 | 381 | 381 | 381 | 381 | 381 | 381 | 381 | 361 | 341 | 321 |
| 13 | 321 | 401 | 381 | 361 | 341 | 321 | 401 | 401 | 401 | 401 | 401 | 401 | 401 | 401 | 401 | 401 | 401 | 401 | 381 | 361 | 341 |

*FIG. 4*

MACROCELL FREQUENCY PLAN, N=7, THREE SECTORS

| | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| ROW | 1A | 2A | 3A | 4A | 5A | 6A | 7A | 1B | 2B | 3B | 4B | 5B | 6B | 7B | 1C | 2C | 3C | 4C | 5C | 6C | 7C |
| 1 | 1 | 2 | 3 | 4 | 5 | 6 | 7 | 8 | 9 | 10 | 11 | 12 | 13 | 14 | 15 | 16 | 17 | 18 | 19 | 20 | 21 |
| 2 | 22 | 23 | 24 | 25 | 26 | 27 | 28 | 29 | 30 | 31 | 32 | 33 | 34 | 35 | 36 | 37 | 38 | 39 | 40 | 41 | 42 |
| 3 | 43 | 44 | 45 | 46 | 47 | 48 | 49 | 50 | 51 | 52 | 53 | 54 | 55 | 56 | 57 | 58 | 59 | 60 | 61 | 62 | 63 |
| 4 | 64 | 65 | 66 | 67 | 68 | 69 | 70 | 71 | 72 | 73 | 74 | 75 | 76 | 77 | 78 | 79 | 80 | 81 | 82 | 83 | 84 |
| 5 | 85 | 86 | 87 | 88 | 89 | 90 | 91 | 92 | 93 | 94 | 95 | 96 | 97 | 98 | 99 | 100 | 101 | 102 | 103 | 104 | 105 |
| 6 | 106 | 107 | 108 | 109 | 110 | 111 | 112 | 113 | 114 | 115 | 116 | 117 | 118 | 119 | 120 | 121 | 122 | 123 | 124 | 125 | 126 |
| 7 | 127 | 128 | 129 | 130 | 131 | 132 | 133 | 134 | 135 | 136 | 137 | 138 | 139 | 140 | 141 | 142 | 143 | 144 | 145 | 146 | 147 |
| 8 | 148 | 149 | 150 | 151 | 152 | 153 | 154 | 155 | 156 | 157 | 158 | 159 | 160 | 161 | 162 | 163 | 164 | 165 | 166 | 167 | 168 |
| 9 | 169 | 170 | 171 | 172 | 173 | 174 | 175 | 176 | 177 | 178 | 179 | 180 | 181 | 182 | 183 | 184 | 185 | 186 | 187 | 188 | 189 |
| 10 | 190 | 191 | 192 | 193 | 194 | 195 | 196 | 197 | 198 | 199 | 200 | 201 | 202 | 203 | 204 | 205 | 206 | 207 | 208 | 209 | 210 |
| 11 | 211 | 212 | 213 | 214 | 215 | 216 | 217 | 218 | 219 | 220 | 221 | 222 | 223 | 224 | 225 | 226 | 227 | 228 | 229 | 230 | 231 |
| 12 | 232 | 233 | 234 | 235 | 236 | 237 | 238 | 239 | 240 | 241 | 242 | 243 | 244 | 245 | 246 | 247 | 248 | 249 | 250 | 251 | 252 |
| 13 | 253 | 254 | 255 | 256 | 257 | 258 | 259 | 260 | 261 | 262 | 263 | 264 | 265 | 266 | 267 | 268 | 269 | 270 | 271 | 272 | 273 |
| 14 | 274 | 275 | 276 | 277 | 278 | 279 | 280 | 281 | 282 | 283 | 284 | 285 | 286 | 287 | 288 | 289 | 290 | 291 | 292 | 293 | 294 |
| 15 | 295 | 296 | 297 | 298 | 299 | 300 | 301 | 302 | 303 | 304 | 305 | 306 | 307 | 308 | 309 | 310 | 311 | 312 | 313 | 314 | 315 |
| 16 | 316 | 317 | 318 | 319 | 320 | 321 | 322 | 323 | 324 | 325 | 326 | 327 | 328 | 329 | 330 | 331 | 332 | 333 | 334 | 335 | 336 |
| 17 | 337 | 338 | 339 | 340 | 341 | 342 | 343 | 344 | 345 | 346 | 347 | 348 | 349 | 350 | 351 | 352 | 353 | 354 | 355 | 356 | 357 |
| 18 | 358 | 359 | 360 | 361 | 362 | 363 | 364 | 365 | 366 | 367 | 368 | 369 | 370 | 371 | 372 | 373 | 374 | 375 | 376 | 377 | 378 |
| 19 | 379 | 380 | 381 | 382 | 383 | 384 | 385 | 386 | 387 | 388 | 389 | 390 | 391 | 392 | 393 | 394 | 395 | 396 | 397 | 398 | 399 |
| 20 | 400 | 401 | 402 | 403 | 404 | 405 | 406 | 407 | 408 | 409 | 410 | 411 | 412 | 413 | 414 | 415 | 416 | | | | |

UNDERLAY MICROCELL FREQUENCY PLAN

| | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| ROW | 1A | 2A | 3A | 4A | 5A | 6A | 7A | 1B | 2B | 3B | 4B | 5B | 6B | 7B | 1C | 2C | 3C | 4C | 5C | 6C | 7C |
| 1 | 1 | 17 | 17 | 17 | 17 | 1 | 1 | 1 | 1 | 1 | 1 | 1 | 1 | 1 | 1 | 1 | 1 | 1 | 1 | 1 | 1 |
| 2 | 17 | 33 | 33 | 33 | 33 | 17 | 17 | 17 | 17 | 17 | 17 | 17 | 49 | 49 | 49 | 49 | 17 | 33 | 33 | 33 | 33 |
| 3 | 33 | 49 | 81 | 81 | 81 | 33 | 33 | 65 | 65 | 65 | 65 | 33 | 65 | 65 | 65 | 65 | 33 | 49 | 49 | 49 | 49 |
| 4 | 49 | 65 | 97 | 97 | 97 | 81 | 49 | 81 | 81 | 81 | 81 | 49 | 81 | 113 | 113 | 113 | 49 | 65 | 97 | 97 | 97 |
| 5 | 97 | 81 | 113 | 145 | 145 | 97 | 65 | 97 | 129 | 129 | 129 | 65 | 97 | 129 | 129 | 129 | 65 | 81 | 113 | 113 | 113 |
| 6 | 113 | 97 | 129 | 161 | 161 | 145 | 81 | 113 | 145 | 145 | 145 | 81 | 113 | 145 | 177 | 177 | 113 | 97 | 129 | 161 | 161 |
| 7 | 161 | 113 | 145 | 177 | 209 | 161 | 97 | 129 | 161 | 193 | 193 | 129 | 129 | 161 | 193 | 193 | 129 | 113 | 145 | 177 | 177 |
| 8 | 177 | 161 | 161 | 193 | 225 | 209 | 145 | 145 | 177 | 209 | 209 | 145 | 145 | 177 | 209 | 241 | 177 | 129 | 161 | 193 | 225 |
| 9 | 225 | 177 | 177 | 209 | 241 | 225 | 161 | 161 | 193 | 225 | 257 | 193 | 193 | 193 | 225 | 257 | 193 | 177 | 177 | 209 | 241 |
| 10 | 241 | 225 | 225 | 225 | 257 | 273 | 209 | 209 | 209 | 241 | 273 | 209 | 209 | 209 | 241 | 273 | 241 | 193 | 193 | 225 | 257 |
| 11 | 289 | 241 | 241 | 241 | 273 | 289 | 225 | 225 | 225 | 257 | 289 | 257 | 257 | 257 | 257 | 289 | 257 | 241 | 241 | 241 | 273 |
| 12 | 305 | 289 | 289 | 289 | 289 | 305 | 273 | 273 | 273 | 273 | 305 | 273 | 273 | 273 | 273 | 305 | 305 | 257 | 257 | 257 | 289 |
| 13 | 321 | 305 | 305 | 305 | 305 | 321 | 289 | 289 | 289 | 289 | 321 | 321 | 321 | 321 | 321 | 321 | 321 | 305 | 305 | 305 | 305 |
| 14 | 337 | 353 | 353 | 353 | 353 | 337 | 337 | 337 | 337 | 337 | 337 | 337 | 337 | 337 | 337 | 337 | 337 | 321 | 321 | 321 | 321 |
| 15 | 353 | 369 | 369 | 369 | 369 | 353 | 353 | 353 | 353 | 353 | 353 | 353 | 385 | 385 | 385 | 385 | 353 | 369 | 369 | 369 | 369 |
| 16 | 369 | 385 | | | | 369 | 369 | 401 | 401 | 401 | 401 | 369 | 401 | 401 | 401 | 401 | 369 | 385 | 385 | 385 | 385 |
| 17 | 385 | 401 | | | | 385 | | | | | | 385 | | | | | 385 | 401 | | | |
| 18 | | | | | | 401 | | | | | | 401 | | | | | 401 | | | | |

*FIG. 5*

MICROCELL FREQUENCY PLANNING

BACKGROUND OF THE INVENTION

I. Field of the Invention

The present invention relates to radio communications. More particularly, the present invention relates to cellular radiotelephone frequency planning.

II. Description of the Related Art

A cellular radio communication system is typically comprised of a number of cells covering a geographic region. Each cell's base station is allocated a number of radio channels. The cell may also be divided up into sectors, each sector having a number of different channels.

The cell shapes are determined by both the radiation pattern of the antennas and the local conditions at the cell site. Cells, however, are typically idealized as hexagonal patterns since such a pattern closely approximates the ideal antenna radiation pattern.

Cells are typically organized in clusters. Each cluster has a predetermined number of cells (i.e., N=7 refers to the cluster having 7 cells) with each cell being assigned different frequency groups. The same frequency groups are reused in corresponding cells of different clusters. These clusters are repeated as needed to cover a geographic area. This frequency layout concept is illustrated in FIG. 1.

In a typical mobile system, a subscriber is not configured to a specific cell. In mobile systems, a radio channel is allocated to the radiotelephone for call initiation based on the Received Signal Strength Indicator (RSSI) and the availability of radio channels. As the radiotelephone moves through different cells of the cellular system, the radio channels are dynamically allocated to the mobile as the channel's signal strength changes.

Cellular radiotelephone systems use different channel frequencies for each mobile radiotelephone. The link from the mobile to the cell, referred to as the reverse channel, uses one frequency while the link from the cell to the radiotelephone, referred to as the forward channel, uses another frequency. These two frequencies are not used by other nearby radiotelephones as this would lead to interference on the channel and a reduction in signal quality. This interference is referred to in the art as co-channel interference. The ratio $D/R=\sqrt{3N}$, where D is the distance between frequency reuse, R is the radius of the cells, and N is the number of cells in a cluster, is a rough measure of co-channel interference in a cellular system.

Adjacent channel interference is another type of interference experienced by cellular radiotelephone users. Adjacent channel interference is due to the energy slipover between adjacent channels as a result of imperfect filtering on both the transmit and receive sides.

Both types of interference affect signal quality, referred to as the carrier to interference ratio (C/I). This ratio is the signal strength of the received desired carrier to the signal strength of the received interfering carriers. A number of physical factors can also affect C/I in cellular systems: buildings, geography, antenna radiation patterns, mobile traffic transmitting power, and mobile traffic location within the cell. C/I in a typical system, needs to be maintained at a nominal value of 17 dB most of the time.

Due to the low power of the cell's transmitters, the same frequencies can be reused in other cells. Cells in the same geographical area sharing the same frequencies are referred to in the art as co-channel cells. Greater frequency reuse allows more mobile traffic to use the cellular system. Due to co-channel interference, however, there are constraints on the location of the co-channel cells.

Frequency spectrum usage is optimized by a frequency planning process. This enhances channel capacity and reduces interference. Frequency planning involves channel numbering, channel grouping into subsets, and assigning particular channels to particular cells/sectors. The principal objective of frequency planning is to ensure adequate channel isolation to reduce channel interference while maintaining a high channel capacity.

One method for determining frequency reuse is illustrated in U.S. Pat. No. 5,483,667 to Faruque and assigned to Northern Telecom Limited. This patent teaches an N=3 frequency plan using 60° cell sectors and divides the channels into 18 frequency groups. In the Advanced Mobile Phone System (AMPS) used in North America, 416 frequencies are available for cellular use. These 416 frequencies must be divided among the cells and reused as necessary to provide coverage to a metropolitan or other geographical area. Additionally, 21 of these channel frequencies must be used as control frequencies to establish and maintain calls between radiotelephone users and cells. This provides 395/18=22 voice channels per sector or 22×6=132 voice channels per cell with a reuse distance of $D/R=\sqrt{3N}=\sqrt{3\times3}=3$.

Microcells are lower power cells that generally cover a smaller area than macrocells. Microcells are typically deployed in a cellular system as a cost effective solution for at least two applications: cold and hot spot coverage. Cold spot coverage occurs in a macrocell system that has radio signal coverage holes. In this situation, the radiotelephone either cannot communicate with any base station or the quality of the communication signal is substantially reduced due to lack of coverage.

In a hot spot coverage situation, a macrocell or macrocells experience a high concentration of traffic. In this case, the base station may run out of available frequencies and not be able to handle additional mobile traffic.

In both situations, microcells are typically added as underlay cells to the existing macrocell system. Once underlayed, the microcells require a frequency assignment. The typical methods for assigning frequency groups to microcells are reusing frequencies and reserving or segregating frequencies.

In the frequency reuse scheme, a microcell reuses the frequencies assigned to the macrocell system. This introduces additional co-channel interference to the macrocell system due to the proximity of additional uses of the same frequency.

In the frequency reservation or segregation scheme, a block of frequencies normally used by the macrocell system is now assigned exclusively to the microcells. This scheme takes away large blocks of frequencies that could be used by parts of the macrocell system, thereby reducing the number of frequencies per sector that are assigned to each macrocell. There is a resulting need for a frequency planning process to assign frequencies to underlying microcells.

SUMMARY OF THE INVENTION

The present invention encompasses a cellular radio system and process for microcellular frequency layout in the cellular system. The cellular system comprises microcells and macrocells. The macrocells are organized into macrocell clusters where each cluster has a plurality of macrocells. Both the macrocells and the microcells are comprised of sectors.

The process assigns a frequency group, comprising a plurality of frequencies, to each macrocell sector. A frequency is selected from each of a predetermined number of predetermined frequency groups. These selected frequencies are assigned to the microcells. A selected frequency must have a minimum channel separation from other selected microcell frequencies. In the preferred embodiment, this separation is 8 channels.

Alternate embodiments compare the selected frequencies to the frequencies of the nearby macrocell frequencies. If any of the microcell frequencies are less than a certain channel separation from the nearby macrocell frequencies, those particular microcell frequencies are deleted from the microcell frequency group.

BRIEF DESCRIPTION OF THE DRAWINGS

FIG. 4 shows an embodiment of a frequency plan table for the frequency interleaved segregation process of the present invention.

FIG. 5 shows an alternate embodiment of a frequency plan table for the frequency interleaved segregation process of the present invention.

DETAILED DESCRIPTION OF THE PREFERRED EMBODIMENT

The cellular system and process of the present invention uses interleaved frequency reservation to assign frequencies to an underlying, microcellular system. This provides greater flexibility for assigning frequencies to microcells and does not require the retuning of the macrocells due to a frequency group change as required in a block reservation scheme.

Figure 1:
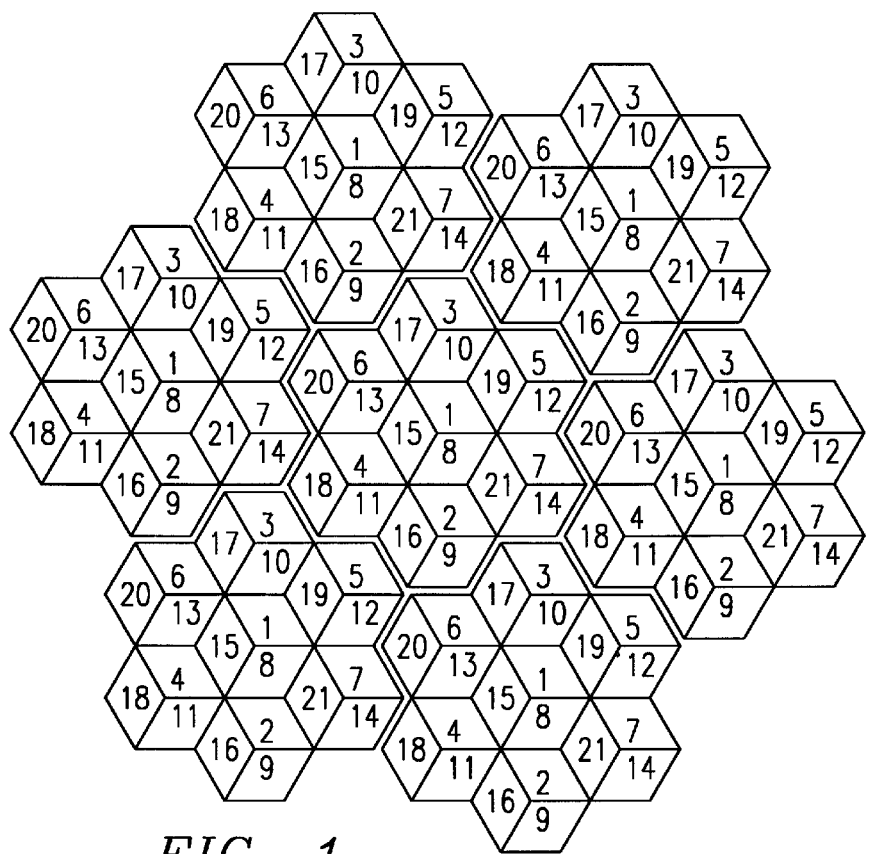
FIG. 1 shows a typical prior art N=7 macrocellular system.
Figure 2:
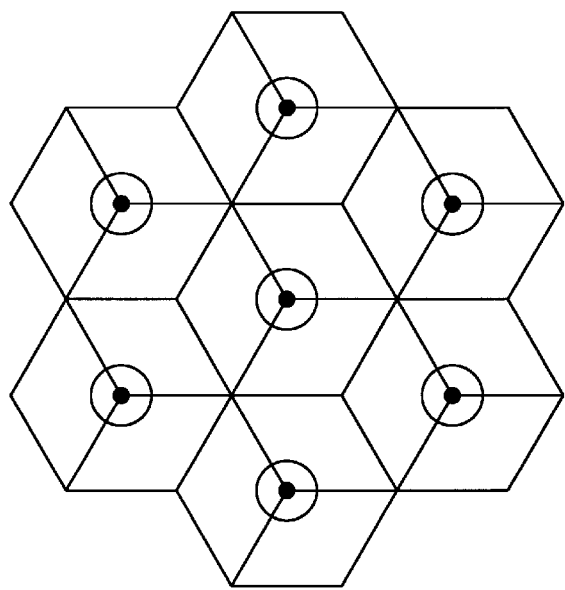
FIG. 2 shows a preferred embodiment of a microcellular system of the present invention.
Figure 3:
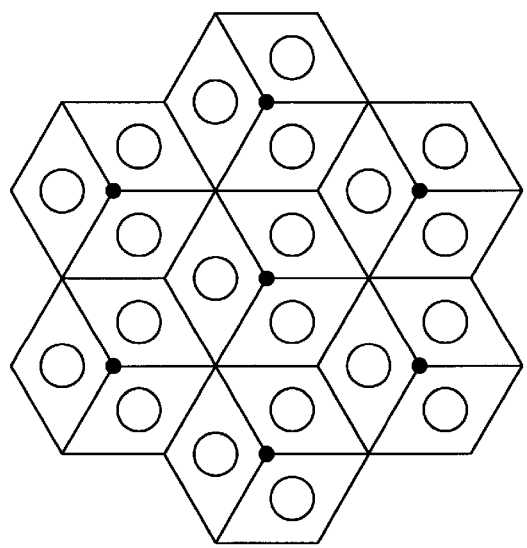
FIG. 3 shows an alternate embodiment of the microcellular system of the present invention.

The preferred embodiment of the microcell system of the present invention is illustrated in FIG. 2. This figure shows a microcell being reused in every cell of the macrocellular system. FIG. 3 illustrates an alternate embodiment where the microcell is reused in every sector of each macrocell of the macrocellular system.

Figure 6:
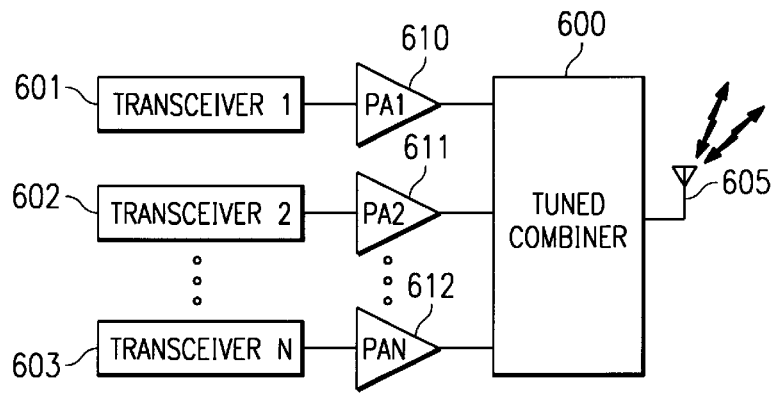
FIG. 6 shows a cell site of the present invention.

An embodiment of a cell site's base station of the present invention is illustrated in FIG. 6. Each cell of FIGS. 2 and 3 are each comprised of the apparatus of FIG. 6. The cell site is comprised of a number of transceivers (601–603), each tuned to a frequency of the frequency group assigned to the particular sector serviced by that transceiver.

The transceivers (601–603) are each coupled to a separate power amplifier (610–612) that boosts the power output of the transceivers to the 45 watts transmit power. Alternate embodiments could use other power outputs depending on the application.

The outputs of the power amplifiers (610–612) are input to a conventional high-power, tuned combiner (600). The combiner (600), using conventional combining techniques well known in the art, combines the various signals of different frequencies from the transceivers (601–603) to be transmitted on the cell site antenna (605).

As is well known in the art, each of the input ports of a tuned combiner (600) is associated with a narrow band filter. An input signal is rejected at other input ports because it does not resonate and is therefore unmatched. This minimizes the insertion loss on each signal at the combining ports. Because this type of combining relies on the frequency separation of the different input signals, a minimum frequency separation between channels in the same cell must be maintained. The frequency separation using tuned combiners, therefore, is typically 21 channels, i.e., 630 kHz.

Figure 7:
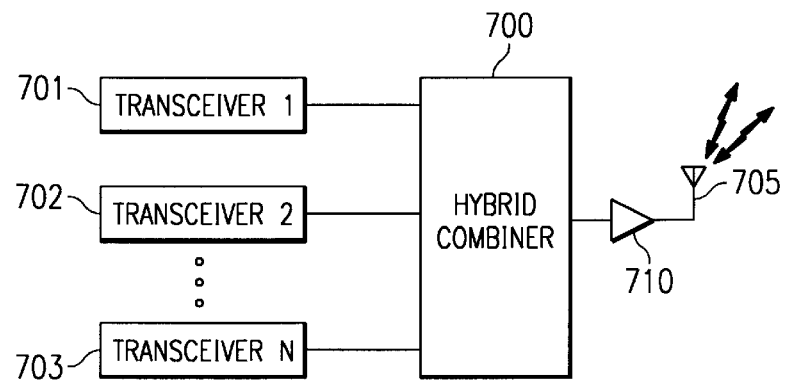
FIG. 7 shows an alternate embodiment of a cell site of the present invention.

FIG. 7 illustrates an alternate embodiment base station. This embodiment uses the same transceivers (701–703) as the preferred embodiment of FIG. 6. However, the embodiment of FIG. 7 uses a lower power, hybrid combiner (700) in place of the high-power, tuned combiner of FIG. 6. The low power output from the combiner (700) is amplified to the transmit power for required by the particular application by a multi-carrier linear power amplifier (MCLPA) (710) before being transmitted on the cell site antenna (705). In the preferred embodiment, the transmit power is 45 watts but alternate embodiments use other power levels.

The hybrid combiner (700) does not impose a limit on frequency separation. Because the unwanted hybrid ports are terminated, the combining loss is much higher. Since the hybrid combiner (700) is normally used to combine signals at low power levels to drive a multi-carrier, linear power amplifier, the loss is not a concern. Therefore, for the microcell system of the present invention, using hybrid combining not only relaxes the frequency separation requirement for frequency planning but also provides frequency agility for dynamic channel assignment.

The interleaved frequency reservation process of the present invention is a variation of the frequency segregation scheme previously discussed. The frequency layout process selects frequencies to be assigned to the underlaid microcells. Various frequencies are selected from the macrocell frequency groups in an interleaved fashion and assigned to the microcell frequency groups.

The frequencies are selected from the macrocell frequencies on the basis of channel separation. In the preferred embodiment, the frequencies are selected such that a minimum channel separation of 8 channels exists between any two selected channels.

After the microcell frequency group is formed by the selected frequencies, it is assigned to the microcells. A comparison of the surrounding frequencies in the overlaying macrocell is performed to determine the channel separation of the microcell frequencies and the macrocell frequencies. This is necessary to reduce adjacent channel interference. Any microcell channel not having a minimum separation of 4 channels on either side is deleted from that particular microcell. This comparison is performed between all macrocells and their underlying microcells. Additionally, if the microcell is close to the border of the macrocell, the comparison is performed between the microcell and the nearby macrocell.

A table illustrating the preferred embodiment of the interleaving frequency selection process is illustrated in FIG. 4. The upper table is a frequency layout for a macrocell cluster in an N=7 system to which 416 channels are allotted. Each cell is comprised of 3 sectors. In this example, the sectors are labeled A–C. The column headings of the table are the cell number and sector letter. The numbers below each heading represents the channel numbers assigned to that particular sector. For example, channels 1, 22, 43, 64, 85, 106, 127, 148, 169, 190, 211, 232, 253, 274, 295, 316, 337, 358, 379, and 400 are assigned to cell/sector 1A.

Figure 8:
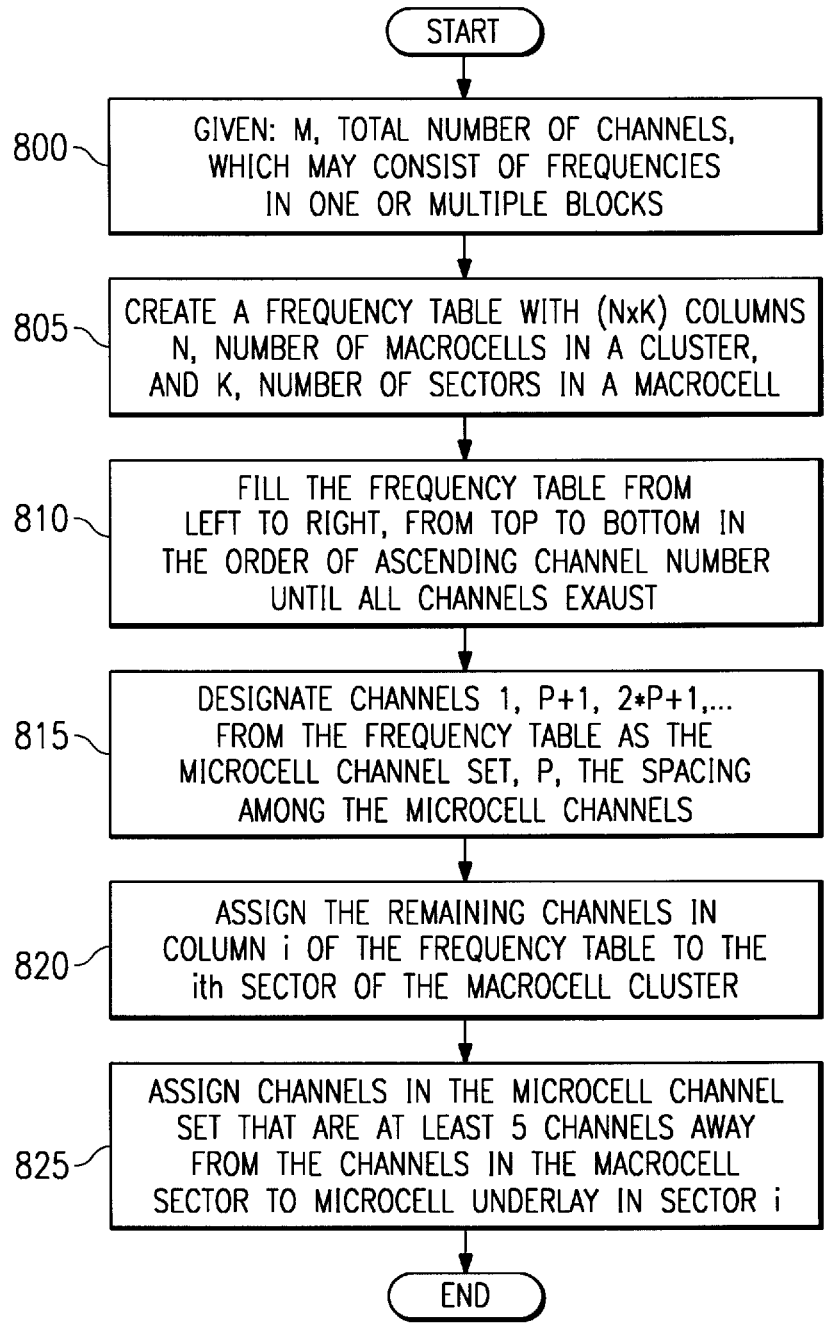
FIG. 8 shows a flowchart of the process of the present invention.

The tables of FIG. 4 are created using the process illustrated in the flowchart of FIG. 8. The process starts with M total channels (800). These frequencies may be individual or grouped together in blocks referred to as frequency groups. The embodiment of FIG. 4 assigns M to be 416 individual channels.

As seen in FIG. 8, the table is next created with N x K columns (805). N is the number of macrocells in a cluster and K is the number of sectors in the macrocell. In the embodiment of FIG. 4, N=7 and K =3 which results in a 21 column table.

The frequency table is then filled from left to right and top to bottom, in order of ascending channel numbers, until all of the allotted frequencies are used (810), as shown in FIG. 8. In the FIG. 4 embodiment, the channels start at number 1 and end at number 416.

The microcell frequencies are then chosen from the frequency table to create the underlay frequency plan illustrated in the lower table of FIG. 4. Since, in the preferred embodiment, one microcell is assigned to each macrocell, as illustrated in FIG. 2, this table also has seven cells with three sectors per cell. As in the macrocell table, the sectors are labeled A-C for each cell.

Referring to FIG. 8, the microcell channels are now designated (815) from the just laid out frequency table. The microcell channel frequency group is chosen by the series: 1, P+1, 2P+1, 3P+1, etc., where P is the spacing between the microcell channels.

This step (815) is illustrated in the upper table of FIG. 4. In this example P is 20 so that the microcell frequency group becomes: 1, 21, 41, 61, etc. Alternate embodiments use a spacing of P that is different than 20.

The next step of the frequency interleave process is to assign, to the macrocell cluster, the channels remaining in column i after the interleaved frequency segregation (820). The segregated channels are illustrated in the upper table of FIG. 4 by the highlighting. Any channels in a sector not highlighted are assigned to that particular sector.

Finally, FIG. 8 shows the next step of the process assigns channels from the microcell frequency group to the microcell (825). The channels assigned to sector i in the microcell must be at least 5 channels away from the channels in the macrocell sector. This step is illustrated in the lower table of FIG. 4.

Referring to the lower table of FIG. 4, sector 1A is assigned the channels from the selected microcell frequency group. The process starts at the lowest channel of the selected frequency group and comparing each channel to the channels in sector 1A of the macrocell. The first channel that is 5 channels from a macrocell sector 1A channel is assigned to sector 1A of the microcell. In this example, the first channel to be assigned is channel 1 since it was removed from the macrocell sector 1A and is at least 5 channels from the other channels of that sector.

The next channel assigned is channel 101 since 21, 41, 61, and 81 are not 5 channels from channels 22, 43, 64, and 85 respectively of the macrocell. This process is repeated for the remaining sectors of the microcell until all of the selected frequencies are used.

FIG. 5 illustrates a second embodiment of the frequency interleaved segregation process of the present invention. As in the embodiment of FIG. 4, the cell/sector numbers head the columns of the table and the channel numbers are assigned sequentially to each sector of the system from the top left corner. However, in this embodiment, the frequencies segregated for use by the microcell system are chosen using a spacing, P, of 16. This creates the microcell frequency group of 1, 17, 33, 49, etc.

The lower table of FIG. 5 shows another example of the assignment of the selected microcell frequency group channels to the various sectors of the microcell. As in the embodiment of FIG. 4, sector 1A of the lower table of FIG. 5 starts with the lowest channel that is 5 channels from the channels of macrocell sector 1A. This channel is 17 followed by 33, etc. In this example, not all of the rows of the microcell sectors are filled since there are no remaining channels from the selected frequencies that are 5 channels away from the channels of sector 1A of the macrocell. In this case, the row is left blank.

The embodiments illustrated in FIGS. 4 and 5 simply represent two examples of the interleaved reservation process. The different results achieved by these two embodiments show that the process of the present invention can be realized in multiple ways. The frequencies can be selected in different ways and the selected frequencies can be assigned to the microcells in different ways. As an example, an alternate embodiment starts with channel 2 instead of channel 1 such that the series of selected frequencies becomes: 2, P+2, 2P+2, etc.

The only requirement for the process of the present invention is that the selected frequencies be separated by a minimum distance to assure that adjacent and co-channel interference does not reduce the quality of the signals. Alternate embodiments use other minimum distance requirements than the 5 channel separation of the preferred embodiment. For example, a digital system that can better filter signals may be able to operate with less of a minimum channel separation. Still other embodiments might require more of a channel separation due to other factors.

In an alternate embodiment, using the configuration of FIG. 3, the assignment of frequencies to the microcells would have to be modified. In this embodiment, the frequencies in all of the sectors of the microcell would have to be compared to sector i of the macrocell before being assigned to the microcell. This is due to the entire microcell and, thus, all of the microcell's sectors, are underlaid to the macrocell sector i.

In the process of the present invention, even if 4 frequencies from either side of a macrocell frequency column, in the tables of FIGS. 4 and 5 are excluded from use, only 7 frequencies will be excluded, i.e., there will always be 9 frequencies available for a microcell. Also, since the channel separation of the present invention is less than the block reservation scheme, only 25 channels need to be reserved to get a frequency group of 15 channels. Additionally, more microcell frequency groups can be constructed from the tables by simply shifting the shaded cells.

The interleaved frequency segregation process of the present invention provides many additional benefits. Frequencies can be reserved one frequency group at a time instead of in blocks as in the block reservation scheme. Additionally, the frequencies are selected from macrocells so that existing macrocells do not have to be retuned due to blocks of frequencies being removed.

Also, the interleaved frequency segregation process is compatible with either the tuned combiner or the hybrid combiner so that adding a microcell structure to an existing macrocellular layout does not require additional hardware changes. The prior art block reservation process is not compatible with the tuned combining techniques of FIG. 6. Tuned combiners require a minimum channel separation of approximately 21 channels. If an existing base station uses a tuned combiner, the base station hardware would have to be changed in order to add a microcell.

We claim:

1. A method for microcellular frequency layout in a cellular radio system, the system comprising at least one microcell and at least one macrocell, each macrocell and each microcell comprising at least one sector, each sector of the macrocell having a plurality of frequencies, the method comprising the steps of:

selecting and thereby removing a predetermined number of frequencies from each of the plurality of frequencies such that each selected frequency has a first frequency separation from the other selected frequencies; and assigning the selected frequencies to a first sector of each microcell such that each assigned frequency is separated by a second frequency separation from other assigned frequencies in a macrocell sector, the second frequency separation being a different separation than the first frequency separation.

2. The method of claim 1 wherein the step of selecting includes selecting the predetermined number of frequencies based on a fixed first frequency separation.

3. A method for microcellular frequency layout in a cellular radio system, the system comprising a plurality of microcells and a plurality of macrocells, the plurality of macrocells organized into macrocell clusters with the microcells underlaid to the macrocells, each macrocell cluster comprising a plurality of macrocells, each microcell and each macrocell comprising a plurality of sectors, the method comprising the steps of:

assigning a macrocell frequency group, comprising a plurality of frequencies, to each macrocell sector of the plurality of macrocell sectors;

selecting and thereby removing a frequency from each macrocell frequency group such that each selected frequency is separated from other selected frequencies by at least a first predetermined frequency separation;

combining the selected frequencies into a plurality of microcell frequency groups such that each frequency in a first microcell frequency group is separated from each frequency in a first macrocell frequency group by a second predetermined frequency separation, the second predetermined frequency separation being different than the first predetermined frequency separation; and assigning the plurality of microcell frequency groups to the plurality of microcells such that each microcell sector is assigned a microcell frequency group.

4. The method of claim 3 wherein the first microcell frequency group is underlaid to the first macrocell frequency group.

5. A cellular radio system comprising:

a plurality of macrocells organized into macrocell clusters, each macrocell cluster comprising a plurality of macrocells, each macrocell comprising a plurality of sectors;

a plurality of microcells comprising a plurality of sectors, the plurality of microcells underlaid to the plurality of macrocells;

a plurality of macrocell frequency groups, each group comprising a plurality of frequencies, a macrocell frequency group of the plurality of macrocell frequency groups being assigned to each macrocell sector of the plurality of macrocell sectors; and a plurality of microcell frequency groups, each microcell frequency group comprising a plurality of frequencies selected and thereby removed from the plurality of macrocell frequency groups such that each selected frequency is a first predetermined frequency separation from other selected frequencies in a particular microcell frequency group and each selected frequency is a second predetermined frequency separation, different from the first predetermined frequency separation, from each frequency in a predetermined macrocell frequency group.

6. A method for microcellular frequency layout in a cellular radio system having a plurality of frequencies, the system comprising at least one microcell and a plurality of macrocells, a predetermined number of macrocells of the plurality of macrocells organized into macrocell clusters, each macrocell cluster comprising a plurality of macrocells, each macrocell and each microcell having a predetermined number of sectors, the method comprising the steps of:

creating a frequency table having a predetermined number of columns with intersecting rows, the predetermined number of columns equal to the product of the predetermined number of macrocells in a cluster and the predetermined number of sectors in each macrocell, a first column representing a first frequency group of a first macrocell;

filling each intersection of a column and a row with a frequency of the plurality of frequencies;

designating a microcell frequency group from the plurality of frequencies by selecting predetermined frequencies from the plurality of frequencies, the selected frequencies having a first minimum frequency separation from other selected frequencies of the plurality of frequencies;

assigning frequencies, not designated to the microcell frequency group, to each of the predetermined number of sectors of a macrocell; and assigning frequencies from the microcell frequency group to a first sector of a microcell such that the assigned frequencies have a second minimum frequency separation from the first frequency group of the first macrocell, the second minimum frequency separation different than the first minimum frequency separation.

7. The method of claim 6 wherein the second minimum frequency separation is a fixed frequency separation.

8. A method for microcellular frequency layout in a cellular radio system, the system comprising at least one microcell and at least one macrocell, each macrocell and each microcell comprising at least one sector, each sector of the macrocell having a frequency group comprising a plurality of frequencies, the method comprising the steps of:

selecting and thereby removing frequencies from the frequency groups such that each selected frequency has a first minimum frequency separation from other selected frequencies; and assigning the selected frequencies to a first sector of a microcell such that each assigned frequency is separated by a second minimum frequency separation, different than the first minimum frequency separation, from each frequency of the frequency group of a first sector of a first macrocell.

* * * * *